United States Patent Office 3,428,732
Patented Feb. 18, 1969

3,428,732
LINCOMYCIN ALKYLSULFAMATES
Barney J. Magerlein, Kalamazoo, Mich., assignor to The Upjohn Company, Kalamazoo, Mich., a corporation of Delaware
No Drawing. Continuation-in-part of application Ser. No. 262,341, Mar. 4, 1963. This application Dec. 2, 1964, Ser. No. 415,485
U.S. Cl. 424—181      8 Claims
Int. Cl. A61k 21/00; C07g 3/00

This application is a continuation-in-part of application Ser. No. 262,341, filed Mar. 4, 1963 and now abandoned.

This invention relates to novel salts of lincomycin and, more particularly, to lincomycin alkylsufamates and to compositions containing these salts.

Lincomycin is a recently discovered antibiotic demonstrating pronounced activity against certain Gram-positive organisms, including especially *Staphylococcus aureus*, *Diplococcus pneumoniae*, and the beta-hemolytic streptococci. The effectiveness of this antibiotic has been demonstrated in humans and animals against infections due to susceptible pathogens. However, the antibiotic base and the salts heretofore investigated have been characterized by disagreeable taste properties.

Both the therapeutic usefulness and pharmaceutical elegance of lincomycin compositions in humans and animals are enhanced by incorporation of lincomycin as the lincomycin mono- and dialkyl-sulfamates of this invention. For example, it has now been unexpectedly found that lincomycin mono- and dialkylsulfamates of the formula:

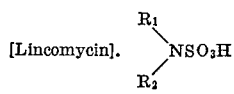

in which $R_1$ is alkyl and $R_2$ is hydrogen or alkyl, the alkyl groups containing 1 through 24 carbon atoms, and being straight or branched chain, make possible lincomycin therapy in liquid form with the bitter taste greatly diminished or eliminated. In addition, product stability is improved and a delayed release of active medicament realized from these salts. Of great importance is the unexpected observation that higher lincomycin blood levels are obtained following administration of lincomycin mono- and dialkylsulfamates as compared with those obtained with lincomycin base and known lincomycin salts, such as the hydrochloride.

An example of the latter phenomenon is seen in mice and dogs. Despite the fact that the hydrochloride salt of lincomycin is very soluble in water and the *n*-hexadecylsulfamate is relatively insoluble (5.1 mg. per 100 ml.), the *n*-hexadecylsulfamate administered orally was found at lincomycin-equivalent doses of 100 mg. per kg. to produce lincomycin blood levels in mice 49% greater than the hydrochloride. Absorption from the gastrointestinal tract produced blood levels which were at all times equal to or greater than those produced by lincomycin from the hydrochloride.

Further confirmation of this distinction was obtained from tests with dogs given the *n*-hexadecylsulfamate and the hydrochloride. Lincomycin *n*-hexadecylsulfamate, given orally, produced on the average 25% greater blood concentrations of lincomycin than did the hydrochloride. The *n*-hexadecylsulfamate was well tolerated in both studies.

Lincomycin mono- and dialkylsulfamates are particularly suited to oral administration in conjunction with pharmaceutical carriers in the form of capsules, tablets, and fluid suspensions (including syrups). The unit dosage forms of these compositions contain from about 100 to about 1,500 mg. of the desired alkyl-sulfamate of lincomycin. In general, liquid preparations, based on single doses of 5 ml., should contain from about 2 to about 25% lincomycin alkylsulfamate. Administration by the intramuscular and subcutaneous routes affords prolonged availability of lincomycin.

Administration of the novel lincomycin salts in pharmaceutical formulations as disclosed herein can be on a schedule of from about 100 to about 1,500 mg. daily given one to four times daily, depending on the patient's age, weight, condition and the nature of the infection being treated.

It is to be understood that this invention embraces, in addition to lincomycin alkylsulfamates as new chemical entities, pharmaceutical compositions including such salts with or without supplementary active ingredients. The essential feature of these compositions is therefore the presence of a lincomycin alkylsulfamate as herein defined. It is likewise to be understood that the usual adjuvants are contemplated for the solid dosage forms, such as capsules and tablets, in order to render the lincomycin alkylsulfamate more adaptable to production procedures. Similarly, the fluid suspension and similar liquid preparations can include suspending agents, flavoring agents, preservatives and other materials designed to facilitate the preparation of a stable and pharmaceutically elegant product.

The preparation of the novel salts of this invention follows classic procedures in which, for example, a mono- or dialkylsulfamic acid containing the desired alkyl group is brought together with lincomycin in 95% ethanol or sodium salts of the said sulfamic acids with lincomycin hydrochloride in aqueous medium. Preparation of the lincomycin base and hydrochloride is described in U.S. Patent No. 3,086,912.

The following examples set forth the best mode contemplated by the inventor for carrying out this invention, but these examples are not to be construed as limiting the scope thereof.

Example 1—Lincomycin *n*-hexylsulfamate

One gram of sodium *n*-hexylsulfamate and 2.2 gm. of lincomycin hydrochloride were reacted in 2.5 ml. of water. After dilution with acetone and refrigerating, the resulting precipitate was filtered and dried to give 1.24 gm. of lincomycin *n*-hexylsulfamate, M.P. 175–195° C.

Example 2.—Lincomycin *n*-octadecylsulfamate

A solution of 370 mg. of *n*-octadecylsulfamic acid and 406 mg. of lincomycin was prepared by heating in 10 ml. of ethanol (95%). The resulting precipitate that formed on cooling was collected by filtration, washed with acetone and dried to give 630 mg. of lincomycin *n*-octadecylsulfamate, M.P. 188–191° C. Infrared spectrum confirmed the structure.

Substituting other mono- or dialkylsulfamates or alkali metal salts thereof for the sulfamates of Examples 1 and 2 gives the corresponding lincomycin mono- or dialkylsulfamates as desired.

Example 3.—Lincomycin *n*-hexadecylsulfamate

To a solution of 10 gm. of *n*-hexadecylsulfamic acid in 50 ml. of warm 95% ethanol was added a solution of 13.27 gm. of lincomycin in 50 ml. of 95% ethanol. One gram of decolorizing carbon was added and the solution filtered under nitrogen pressure through a sterile pad. The filtrate crystallized rapidly. After refrigeration for four hours, the crystals were collected by filtration, washed with water and dried at 55° C. under vacuum to give 16.07 gm. of lincomycin *n*-hexadecylsulfamate, M.P. 181–183° C.

Example 4.—Oral syrup

One thousand milliliters of an aqueous suspension for oral use, containing in each 5 ml. 1,000 mg. of lincomycin n-hexadecyl sulfamate, is prepared from the following ingredients:

| | | |
|---|---|---|
| Lincomycin n-hexadecylsulfamate | gm | 200 |
| Tragacanth | gm | 3 |
| Sucrose | gm | 650 |
| Methylparaben | gm | 0.75 |
| Propylparaben | gm | 0.25 |
| Sorbic acid | gm | 1.0 |
| Saccharin sodium | gm | 2.0 |
| Citric acid | gm | 2.0 |
| Oil of peppermint | ml | 0.25 |
| Oil of orange | ml | 0.125 |
| Cocoa | gm | 100 |
| Deionized water, q.s. | ml | 1000 |

The tragacanth, sucrose, parabens, sorbic acid, saccharin, citric acid and oils are dispersed in sufficient water to make 800 ml. of syrup. The finely powdered lincomycin n-hexadecylsulfamate and cocoa are stirred into the syrup until distribution is uniform. Sufficient water is added to make up the final volume.

One teaspoon twice a day is given to adults in the treatment of infection due to *D. pneumoniae*.

Example 5

In Example 4 above, other lincomycin mono- or dialkylsulfamates, in which the alkyl group contains 1 through 24 carbon atoms, can be substituted for the lincomycin salt therein.

What is claimed is:
1. A lincomycin salt of the formula:

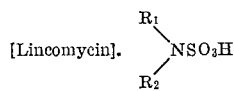

wherein $R_1$ is alkyl and $R_2$ is a member selected from the group consisting of hydrogen and alkyl containing 1 through 24 carbon atoms.

2. Lincomycin n-hexylsulfamate.
3. Lincomycin n-octadecylsulfamate.
4. Lincomycin n-hexadecylsulfamate.
5. A pharmaceutical preparation comprising: from about 100 to about 1,500 mg. of a compound selected from the group consisting of lincomycin mono- and dialkylsulfamates in which the alkyl group contains 1 through 24 carbon atoms, dispersed in a pharmaceutical carrier.
6. A fluid pharmaceutical preparation for oral administration comprising: from about 2 to about 25% lincomycin n-hexylsulfamate, dispersed in a liquid pharmaceutical carrier.
7. A fluid pharmaceutical preparation for oral administration comprising: from about 2 to about 25% lincomycin n-octadecylsulfamate, dispersed in a liquid pharmaceutical carrier.
8. A fluid pharmaceutical preparation for oral administration comprising: from about 2 to about 25% lincomycin n-hexadecylsulfamate, dispersed in a liquid pharmaceutical carrier.

References Cited

UNITED STATES PATENTS 3,086,912   4/1963   Bergy _____ 167—65

LEWIS GOTTS, *Primary Examiner.*

JOHNNIE R. BROWN, *Assistant Examiner.*

U.S. Cl. X.R.

260—210